Sept. 17, 1968  R. E. WALSH  3,401,972
OVERLOAD PROTECTION DEVICE FOR RESCUE HOIST
Filed April 14, 1967  2 Sheets-Sheet 1

INVENTOR.
RALPH E. WALSH
BY *Albert H. Kronman*
ATTORNEY

Sept. 17, 1968   R. E. WALSH   3,401,972
OVERLOAD PROTECTION DEVICE FOR RESCUE HOIST
Filed April 14, 1967   2 Sheets-Sheet 2

INVENTOR.
RALPH E. WALSH
BY Albert A. Kronman
ATTORNEY

United States Patent Office 3,401,972
Patented Sept. 17, 1968

3,401,972
OVERLOAD PROTECTION DEVICE
FOR RESCUE HOIST
Ralph E. Walsh, Long Branch, N.J., assignor to Breeze Corporation, Inc., Union, N.J., a corporation of New Jersey
Filed Apr. 14, 1967, Ser. No. 630,939
8 Claims. (Cl. 294—82)

ABSTRACT OF THE DISCLOSURE

An overload protection device is secured between the hook and the cable of a hoist to absorb the destructive forces of sudden impact during loading. Brake members carried within the protection device are forced into contact with the inner walls of the protection device housing to dampen the force applied to the hook by dissipating it through the frictional contact.

Background of the invention

This invention relates to hooks such as are used in connection with cables coming from rescue hoists. Where a hook is employed to pick up a person or other weight the cable of the hoist is subjected to mandatory severe loading forces. These forces tend to damage the cable by producing unwinding or wear conditions. Accordingly, it is an object of the present invention to provide an overload protection structure between the cable and the hook which will absorb and dissipate the strong forces induced in the cable by impact loading during rescue operations.

Summary of the invention

The invention broadly comprises a hollow housing having the hook of a hoist freely journaled in one end thereof. The hoist cable is led into the housing and secured to a thimble slidably carried within the housing. As the load is applied to the hook, brake members within the housing are forced against the inner wall of the housing by the thimble to dampen the loading forces before they can destroy the cable.

Description of the drawings

Referring to the drawings.

Description of preferred embodiment

Figure 1:
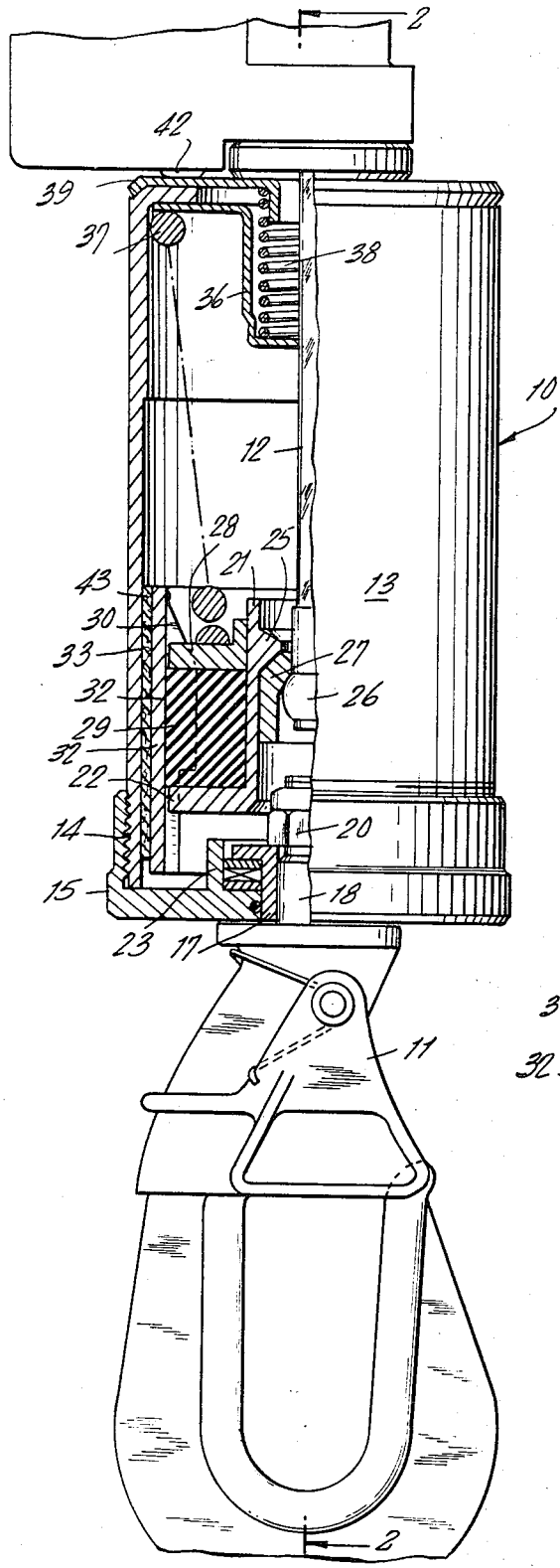
FIGURE 1 is a view in side elevation, partly broken away, of the complete embodiment of the present invention.
Figure 3:
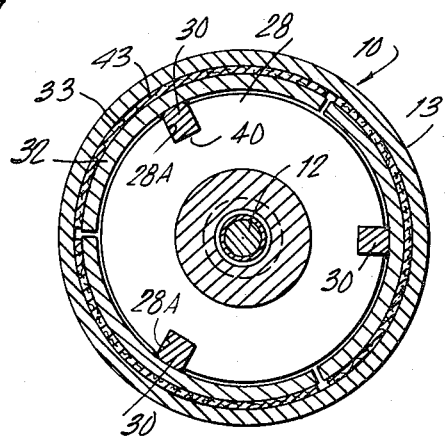
FIGURE 3 is a cross-sectional view taken on line 3—3 in FIGURE 2.
Figure 2:
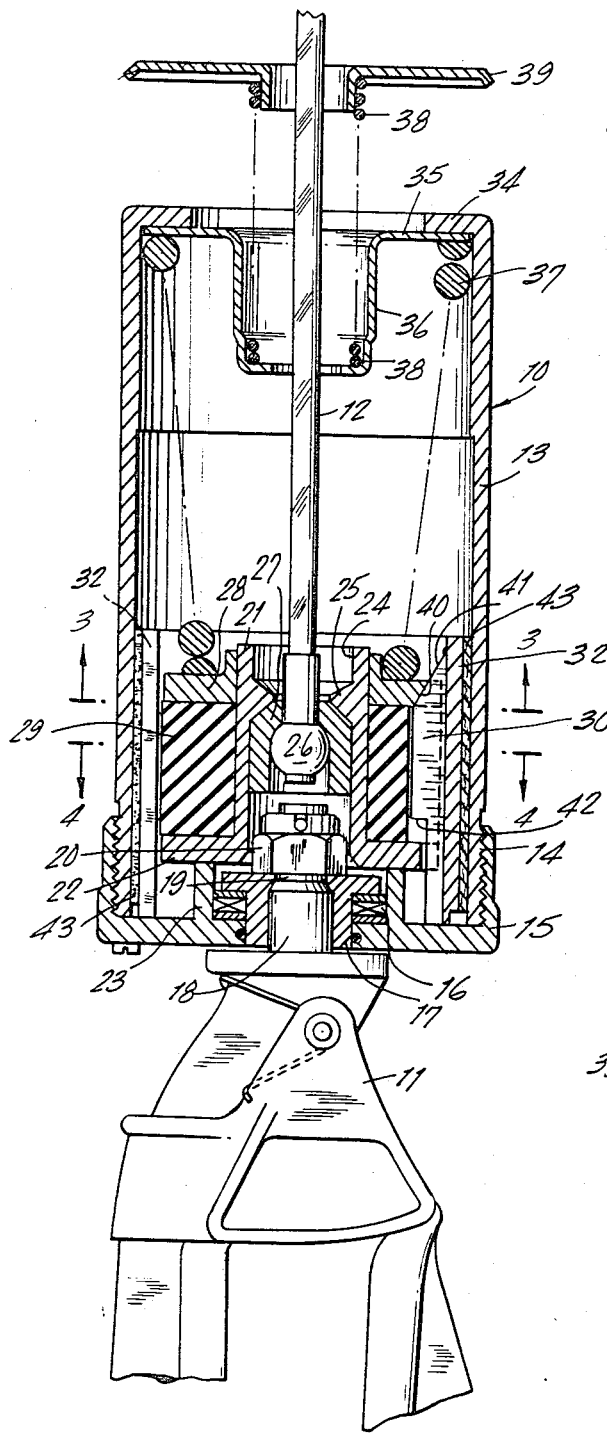
FIGURE 2 is a cross-sectional view taken on line 2—2 in FIGURE 1.
Figure 4:
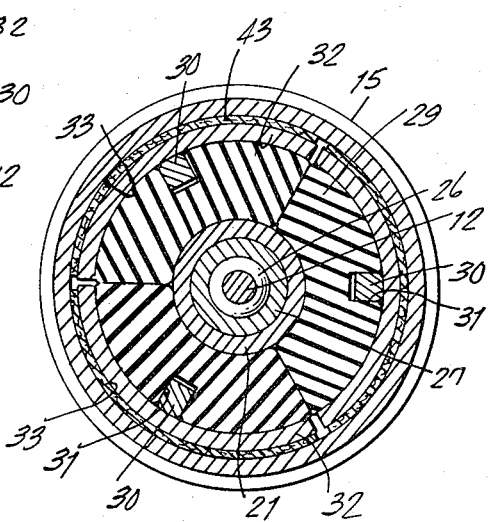
FIGURE 4 is a cross-sectional view taken on line 4—4 in FIGURE 2.

Referring to the drawings and particularly FIGURES 1 and 2, 10 indicates an overload protection device for a rescue hook 11, connected to a stranded cable 12. The protection device 10, is built within a housing 13 in the form of a cylindrical shell threaded on one end as indicated on 14 and having a cap member 15 threaded thereto. The hook 11 is journaled within a thrust bearing 16, carried by the cap member 15. The upper portion of the hook 11 is provided with a cylindrical bearing 17 which is journaled within the thrust bearing 16. A small stub shaft 18 is formed integrally within the upper portion of the hook 11, and is threaded at its upper end 19 to receive a nut 20. The nut 20 rides upon the top of the cylindrical bearing 17 secures hook 11 to the cap 15. It will be observed that the hook 11 is free to swivel within the cap 15. A thimble member 21 is carried within the housing 13 and is provided with a flanged portion 22 at its lower end as shown in FIGURE 2. When the hook is not under load, the flanged portion 22 rests upon a cylindrical stop 23, which is integral with the threaded cap 15 and which forms a housing for the bearing 16. The thimble 21 is provided with an inner cavity 24 within which the end of the cable 12 is received. An annular boss 25 restricts the cavity 24 adjacent to the upper end thereof and prevents the ball fitting 26, which is swaged to the end of the cable 12, from slipping out of the cavity 24. A split bushing 27 is interposed between the ball fitting 26 and the inner wall of the cavity 24. A flanged ring 28 is slipped over the thimble member 21 as best shown in FIGURE 2. The flanged ring 28 rests upon three resilient blocks 29, made of rubber or some elastomer which are carried between the flanged ring 28 and the outwardly extending flanged portion 22 of the thimble 21. Three elongated keys members 30, are each welded to an arcuate brake shoe 32 disposed adjacent the inner wall of the housing 13. The rubber blocks 29 are grooved as indicated at 31 in FIGURE 4, to slidably receive the elongated keys 30.

The flanged ring 28 is provided with radial slots 28A having an inclined end wall as indicated at 40 in FIGURE 2. The inclined end wall 40 rests upon a cam surface 41 at the top of each of the keys 30 and is slidable thereon. The keys 30 are undercut at 42 (see FIGURE 2) to limit the upward movement of the thimble 21 and prevent excessive compression of the rubber blocks 29.

The upper end of the housing 13 is formed with an inwardly turned rim 34, which acts as a stop for a washer member 35. The washer member 35 is provided with a recessed portion 36 which extends into the housing 13. A coiled spring 37 is disposed around the cable 12 between the washer member 35 and the flange 28. The spring 37 normally exerts a light pressure against the flange 28 when the hook 11 is in an unloaded condition.

A second coiled spring 38 is carried around the cable 12 and held within the recessed portion 36 of the washer 35 at one end thereof. The opposite end of the spring 38 is disposed against a ferrule 39 which is spaced from the top of the housing 13 as shown in FIGURE 2.

The ferrule 39 is employed to operate a limit switch 42 (FIGURE 1) to stop the cable when it reaches the end of its reel in position shown in FIGURE 1. The spring 38 will yieldably urge the top of the ferrule 39 against the limit switch 42.

From the foregoing the operation of the device will be apparent. When a load is applied to the hook member 11, the housing 13 will be pulled downwardly compressing the coil spring 37. As the coil spring 37 is compressed, the flange 22 of the thimble 21 will compress the rubber block members 29, extending them into contact with the brake shoes 32 which move outwardly against the housing 13. Further compression of the spring 37 pushes the ring 28 down along the thimble 21. This action causes the inclined surfaces 40 of the ring 28 to force the keys 30 and the shoes 32 against the inner wall 33 of the housing 13. The force applied to the hook 11 is thereby dampened or dissipated through the frictional contact of the linings 43 on the shoes 32. When the load is released from the hook 11 the coil spring permits the parts to return to the position shown in FIGURE 2.

Having thus fully described the invention, what is claimed as new and desired to be secured by Letters Patent of the United States, is:

1. An overload protection device for a hoist cable comprising a hollow housing, a cap threadably carried at one end of the housing, a hook member freely journaled in the cap, a cable member having one end thereof received within the housing, a flanged thimble freely carried by the end of the cable within the thimble, a flanged ring slidably carried by the thimble and spaced from the flanged portion of the said thimble, an elastomer member between the said flanges, a plurality of brake shoes between the elastomer member and the inside surface of the housing, and a spring member between the flanged ring and the end of the housing opposite the cap, whereby tension on the hook will compress the spring member to urge the flanged ring in the direction of the flanged portion of the thimble and force the brake blocks against the inside of the housing.

2. A device according to claim 1 in which the flanged ring is provided with slots to slidable receive keys secured to the inside of the brake shoes.

3. A device according to claim 2 in which the ring slots end in an inclined wall and the keys are tapered adjacent the inclined walls of the slots to provide a cam surface.

4. A device according to claim 3 in which the brake shoes are provided with linings on their outer surfaces.

5. A device according to claim 2 in which the elastomer member comprises a plurality of segments having elongated grooves therein slidably received upon the brake shoe keys.

6. A device according to claim 2 in which the keys are undercut above the flanged portion of the thimble to limit the travel of the said thimble.

7. A device according to claim 1 in which the housing opposite the cap is turned inwardly to receive a recessed washer member disposed around the cable and between the housing and the spring.

8. A device according to claim 7 in which the spring comprises a first coil spring disposed around the cable, a second coil spring is received within the recessed washer and extends outwardly of the housing and a ferrule is freely carried around the cable upon the free end of the spring whereby switch means carried by the hoist may be actuated to stop the said hoist at the end of cable reel-in.

References Cited

UNITED STATES PATENTS 2,058,186   10/1936   Spalding _____ 294—82

EVON C. BLUNK, *Primary Examiner.*

M. L. AJEMAN, *Assistant Examiner.*